(12) United States Patent
Sharma

(10) Patent No.: US 11,893,404 B2
(45) Date of Patent: Feb. 6, 2024

(54) EFFICIENT TRAFFIC FORWARDING BETWEEN VIRTUAL MACHINES

(71) Applicant: Nutanix, Inc., San Jose, CA (US)

(72) Inventor: Ankur Kumar Sharma, Mountain View, CA (US)

(73) Assignee: Nutanix, Inc., San Jose, CA (US)

( * ) Notice: Subject to any disclaimer, the term of this patent is extended or adjusted under 35 U.S.C. 154(b) by 669 days.

(21) Appl. No.: 16/661,546

(22) Filed: Oct. 23, 2019

(65) Prior Publication Data
US 2021/0042142 A1 Feb. 11, 2021

Related U.S. Application Data

(60) Provisional application No. 62/883,549, filed on Aug. 6, 2019.

(51) Int. Cl.
| | | |
|---|---|---|
| G06F 9/455 | (2018.01) | |
| H04L 12/46 | (2006.01) | |
| H04L 45/586 | (2022.01) | |
| H04L 45/00 | (2022.01) | |

(52) U.S. Cl.
CPC ...... *G06F 9/45558* (2013.01); *H04L 12/4641* (2013.01); *H04L 45/586* (2013.01); *H04L 45/66* (2013.01); *G06F 2009/45595* (2013.01)

(58) Field of Classification Search
CPC ....... G06F 9/45558; G06F 2009/45595; H04L 12/4641; H04L 45/586; H04L 45/66; H04L 49/354
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 9,772,866 B1 | 9/2017 | Aron et al. |

(Continued)

OTHER PUBLICATIONS

Unknown Author, "Ethernet Virtual Private Networks (EVPNs)", documentation.nokia.com/html/0_add-h-f/93-0084-HTML/7750_SR_OS_L2_Services_Guide/services_EVPN.html, Sep. 22, 2015 (Year: 2015).*

(Continued)

*Primary Examiner* — Lewis A Bullock, Jr.
*Assistant Examiner* — Kevin X Lu
(74) *Attorney, Agent, or Firm* — Shun Yao; Yao Legal Services, Inc.

(57) ABSTRACT

A system is provided that enables efficient traffic forwarding in a hypervisor. During operation, the hypervisor determines that a packet is from a first virtual machine (VM) running on the hypervisor and destined to a second VM running on a remote hypervisor. The hypervisor then includes a virtual local area network (VLAN) identifier of a transit VLAN (TVLAN) in a layer-2 header of the packet. The TVLAN is dedicated for inter-VM traffic associated with a distributed virtual routing (DVR) instance operating on the hypervisor and the remote hypervisor. Subsequently, the hypervisor sets a first media access control (MAC) address of the hypervisor as a source MAC address and a second MAC address of the remote hypervisor as a destination MAC address in the layer-2 header. The hypervisor then determines an egress port for the packet based on the second MAC address.

20 Claims, 9 Drawing Sheets

(56) References Cited

U.S. PATENT DOCUMENTS

| | | | | |
|---|---|---|---|---|
| 9,923,782 | B1* | 3/2018 | Bindle | G06F 16/951 |
| 2011/0261687 | A1* | 10/2011 | Armstrong | H04L 49/602 |
| | | | | 370/412 |
| 2015/0016469 | A1* | 1/2015 | Ganichev | H04L 49/70 |
| | | | | 370/429 |
| 2015/0188780 | A1* | 7/2015 | Spieser | H04L 43/12 |
| | | | | 370/252 |
| 2016/0036703 | A1* | 2/2016 | Josyula | H04L 45/66 |
| | | | | 370/392 |
| 2016/0261428 | A1* | 9/2016 | Song | H04L 45/745 |
| 2016/0274926 | A1* | 9/2016 | Narasimhamurthy | |
| | | | | G06F 9/45558 |
| 2016/0359745 | A1* | 12/2016 | Hao | H04L 45/64 |
| 2017/0005918 | A1 | 1/2017 | Agarwal et al. | |
| 2017/0317919 | A1* | 11/2017 | Fernando | H04L 41/40 |
| 2018/0234413 | A1* | 8/2018 | Watanabe | H04L 9/0869 |
| 2019/0141010 | A1* | 5/2019 | Chander | H04L 12/4645 |
| 2019/0149357 | A1* | 5/2019 | Wang | H04L 41/0806 |
| | | | | 370/401 |
| 2019/0222440 | A1* | 7/2019 | Huang | H04L 45/18 |
| 2020/0059976 | A1* | 2/2020 | Bhatia | H04W 8/005 |
| 2020/0220793 | A1* | 7/2020 | Hira | H04L 43/026 |
| 2021/0067468 | A1* | 3/2021 | Cidon | H04L 41/122 |

OTHER PUBLICATIONS

1 Poitras, Steven. "The Nutanix Bible" (Oct. 15, 2013), from http://stevenpoitras.com/the-nutanix-bible/ (Publication date based on indicated capture date by Archive.org; first publication date unknown); pp. all.
Poitras, Steven. "The Nutanix Bible" (Jan. 11, 2014), from http://stevenpoitras.com/the-nutanix-bible/ (Publication date based on indicated capture date by Archive.org; first publication date unknown); pp. all.
Poitras, Steven. "The Nutanix Bible" (Jun. 20, 2014), from http://stevenpoitras.com/the-nutanix-bible/ (Publication date based on indicated capture date by Archive.org; first publication date unknown); pp. all.
Poitras, Steven. "The Nutanix Bible" (Jan. 7, 2015), from http://stevenpoitras.com/the-nutanix-bible/ (Publication date based on indicated capture date by Archive.org; first publication date unknown); pp. all.
Poitras, Steven. "The Nutanix Bible" (Jun. 9, 2015), from http://stevenpoitras.com/the-nutanix-bible/ (Publication date based on indicated capture date by Archive.org; first publication date unknown); pp. all.
Poitras, Steven. "The Nutanix Bible" (Sep. 4, 2015), from https://nutanixbible.com/ pp. all.
Poitras, Steven. "The Nutanix Bible" (Jan. 12, 2016), from https://nutanixbible.com/ pp. all.
Poitras, Steven. "The Nutanix Bible" (Jun. 9, 2016), from https://nutanixbible.com/ pp. all.
Poitras, Steven. "The Nutanix Bible" (Jan. 3, 2017), from https://nutanixbible.com/ pp. all.
Poitras, Steven. "The Nutanix Bible" (Jun. 8, 2017), from https://nutanixbible.com/ pp. all.
Poitras, Steven. "The Nutanix Bible" (Jan. 3, 2018), from https://nutanixbible.com/ pp. all.
Poitras, Steven. "The Nutanix Bible" (Jun. 25, 2018), from https://nutanixbible.com/ pp. all.
Poitras, Steven. "The Nutanix Bible" (Jan. 8, 2019), from https://nutanixbible.com/ pp. all.
Poitras, Steven. "The Nutanix Bible" (Jul. 25, 2019), from https://nutanixbible.com/ pp. all.
Poitras, Steven. "The Nutanix Bible" (Sep. 17, 2019), from https://nutanixbible.com/ pp. all.
Cano, Ignacio et al. "Curator: Self-Managing Storage for Enterprise Clusters"; University of Washington; published Mar. 2017; pp. all.
Poitras, Steven. "The Nutanix Bible" (Jan. 21, 2020), from https://nutanixbible.com/ pp. all.
Calix E-Series (E7 OS R2.5) Engineering and Planning Guide, downloaded Jul. 23, 2019 "https://www.calix.com/content/calix/en/site-prod/library-html/systems-products/e-series/pi/planning-resources/net-plan/eap-r25/indexhtm?toc69437144.htm?385%E2/080%A6".

* cited by examiner

EFFICIENT TRAFFIC FORWARDING BETWEEN VIRTUAL MACHINES

RELATED APPLICATIONS

This application claims the benefit of U.S. Provisional Application No. 62/883,549, titled "Efficient Traffic Forwarding Between Virtual Machines," by inventor Ankur Sharma, filed 6 Aug. 2019, the disclosure of which is incorporated by reference herein.

BACKGROUND

Field

The present disclosure relates to a communication network. More specifically, the present disclosure relates to a transit virtual local area network (VLAN) for inter-virtual machine traffic.

Related Art

As Internet traffic is becoming more diverse, virtualization is becoming progressively more important as a value proposition for distributed systems. In addition, the evolution of virtual computing has made multi-tenancy attractive and, consequently, placed additional requirements on the network. For example, a large number of virtual machines (VMs) are being allocated to a large number of tenants. It is often desirable that the network infrastructure can provide a large number of virtualized networks, such as virtual local area networks (VLANs), to support multi-tenancy and ensure network separation among the tenants.

As a result, equipment vendors race to build switches with versatile capabilities, such as virtualization and multi-tenancy, to accommodate diverse network demands efficiently. However, switches with higher capability are usually more complex and expensive. More importantly, because an overly large and complex system often does not provide economy of scale, simply increasing the capability of a switch may become infeasible. To facilitate routing among virtual machines without requiring changes in the physical network, a distributed virtual routing (DVR) instance can be configured on a virtual machine manager, such as a hypervisor. A DVR allows a hypervisor to forward traffic to another hypervisor via a Top-of-Rack (ToR) switch without any modification to the switch.

While DVRs bring many desirable features to traffic forwarding, some issues remain unsolved for forwarding inter-VM traffic.

SUMMARY

One embodiment of the present invention provides a system that enables efficient traffic forwarding in a hypervisor. During operation, the hypervisor determines that a packet is from a first virtual machine (VM) running on the hypervisor and destined to a second VM running on a remote hypervisor. The hypervisor then includes a virtual local area network (VLAN) identifier of a transit VLAN (TVLAN) in a layer-2 header of the packet. The TVLAN is dedicated for inter-VM traffic associated with a distributed virtual routing (DVR) instance operating on the hypervisor and the remote hypervisor. Subsequently, the hypervisor sets a first media access control (MAC) address of the hypervisor as a source MAC address and a second MAC address of the remote hypervisor as a destination MAC address in the layer-2 header. The hypervisor then determines an egress port for the packet based on the second MAC address.

In a variation on this embodiment, the hypervisor includes an identifier of the DVR instance in a layer-3 header of the packet. The layer-3 header is encapsulated by the layer-2 header.

In a further variation on this embodiment, the TVLAN is dedicated for inter-VM traffic associated with a second DVR instance operating on the hypervisor and the remote hypervisor.

In a further variation on this embodiment, the hypervisor maintains a data structure comprising a mapping between a DVR identifier of the DVR instance and the VLAN identifier of the TVLAN. The hypervisor then looks up, based on the DVR identifier, the TVLAN identifier in the mapping for including in the layer-2 header.

In a further variation, the data structure can also include a second mapping between a second DVR identifier of a second DVR instance and a VLAN identifier of a second TVLAN. The second TVLAN can be dedicated for inter-VM traffic associated with the second DVR instance operating on the hypervisor and the remote hypervisor.

In a variation on this embodiment, the hypervisor receives a second packet destined to the VM. The hypervisor then identifies, based on a value of a field of the second packet, that the second packet corresponds to the DVR instance and determines a forwarding interface for the second packet based on the DVR instance.

In a further variation, the value of the field of the second packet indicates one of: (i) the VLAN identifier of the TVLAN in a layer-2 header of the second packet, and (ii) a DVR identifier of the DVR instance in a layer-3 header of the second packet.

In a variation on this embodiment, the first VM and the second VM belong to a first VLAN and a second VLAN, respectively. The first and second VLANs can be distinct from the TVLAN.

In a variation on this embodiment, the hypervisor receives an instruction for forwarding inter-VM traffic based on the TVLAN from a management device. The management device can be a controller of a software-defined network (SDN) and a virtualization manager configured to manage the hypervisor.

In a variation on this embodiment, the hypervisor receives the packet via an interface of the DVR instance on the hypervisor.

BRIEF DESCRIPTION OF THE FIGURES

In the figures, like reference numerals refer to the same figure elements.

DETAILED DESCRIPTION

Figure 1A:
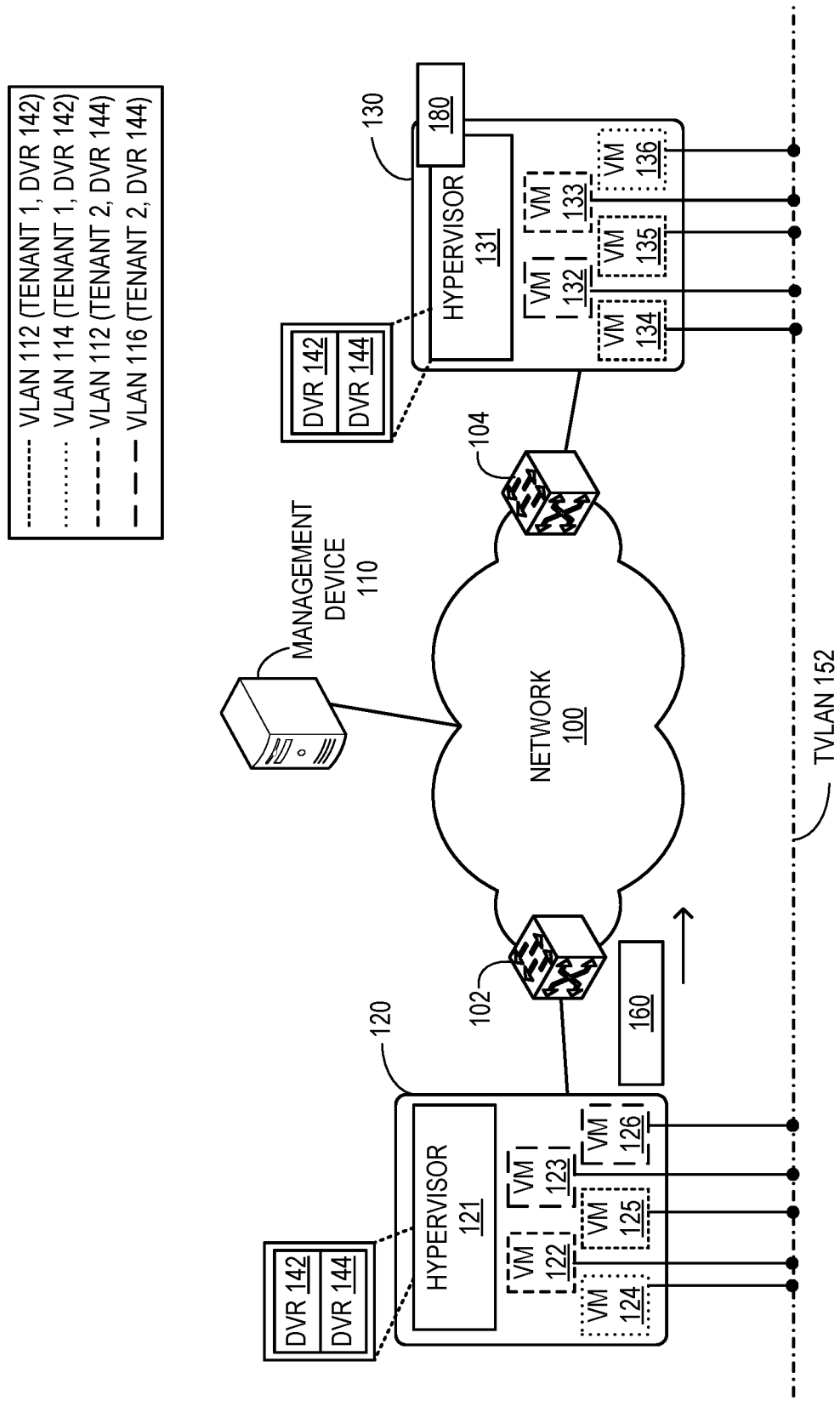
FIG. 1A illustrates an exemplary infrastructure that supports efficient inter-VM traffic forwarding based on a global transit VLAN (TVLAN), in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments described herein solve the problem of efficiently forwarding inter-VM traffic with scalable media access control (MAC) address learning by (i) facilitating a transit VLAN (TVLAN) for inter-VM traffic in a network, and (ii) using MAC addresses of hypervisors as source and destination addresses for forwarding an inter-VM packet in the network. A switch in the network can then learn the MAC address of a hypervisor from a single VLAN, and learn MAC addresses of hypervisors instead of individual VMs. This significantly reduces the number of MAC addresses learned by a switch, thereby facilitating scalability to the MAC address learning process.

With existing technologies, a DVR instance (or a DVR) allows a hypervisor to forward inter-VM traffic to another hypervisor via a switch (e.g., a Top-of-Rack (ToR) switch) of the network. Typically, a DVR instance corresponds to a tenant. By maintaining multiple DVR instances, a hypervisor can maintain separate routing instances for individual tenants based on corresponding routing policies. Hence, the same DVR instance may operate on a respective of the hypervisors that support the corresponding tenant. As a result, the MAC address of the routing interface of the DVR instance is also shared among all hypervisors. To avoid the MAC address from being learned at different ports of different switches of the network, the MAC address of the routing interface cannot be used for forwarding packets in the network.

However, since the DVR instance on a hypervisor operates as the gateway for a VM, when the VM sends a packet to another VM, the packet includes the MAC address of the DVR instance as the destination address. Upon receiving the packet, the hypervisor decapsulates the layer-2 header, looks up the IP address of the destination VM in the DVR instance to determine the corresponding MAC address, and encapsulates the packet with a new layer-2 header. The destination and source addresses of the new layer-2 header can correspond to the MAC addresses of the destination VM and the source hypervisor, respectively. In this way, the packet is forwarded in the network based on the MAC address of the hypervisor as a source MAC address. Upon receiving the packet, the ToR switch of the network learns the MAC address of the hypervisor in association with the VLAN of the destination VM. The switch, therefore, needs to learn the MAC address of each hypervisor for each of the VLANs to learn the corresponding <MAC, VLAN> pairs. Hence, the number of <MAC, VLAN> pairs learned by the switch can be significantly large and may not scale.

To solve this problem, a special transit VLAN (TVLAN) can be dedicated to all inter-VM traffic. The switch can then learn the MAC address of a respective hypervisor on a single TVLAN. This can significantly reduce the number of <MAC, VLAN> pairs learned by the switch. To further reduce the number of <MAC, VLAN> pairs learned over the TVLAN, the forwarding via the TVLAN can be based on MAC addresses of the source and destination hypervisors (i.e., without using the destination VM MAC). As a result, the number of <MAC, VLAN> pairs learned by the switch from inter-VM traffic can be indicated by the number of hypervisors.

However, this technique sends a packet to the destination hypervisor instead of the destination VM. Consequently, the destination hypervisor needs to determine which VM to forward the packet to once the packet reaches the hypervisor. The hypervisor can terminate layer-2 forwarding, promote the packet to layer-3, and use the corresponding DVR instance to determine where to forward the packet. For example, the hypervisor can perform a lookup in the DVR instance based on the layer-3 header of the packet, identify the forwarding interface and the corresponding MAC address (e.g., the MAC address of the destination VM), and forward the packet accordingly.

If the TVLAN is shared among all DVR instances, the TVLAN can be referred to as a global TVLAN. The hypervisor then needs to identify the DVR instance corresponding to the packet for forwarding to the destination VM. In some embodiments, the source hypervisor can include a DVR identifier of the DVR instance in a rarely-used field of a layer-3 header (e.g., fragmentation-related fields in an Internet Protocol (IP) header) to notify the destination hypervisor which DVR instance to select. Upon removing the layer-2 header, the destination hypervisor can inspect the layer-3 header to identify the DVR instance. However, since the field is used in an unconventional way, the intended use of that field becomes restricted.

In some further embodiments, a distinct and unique TVLAN can be allocated for a respective DVR instance. The source hypervisor can include the TVLAN corresponding to the DVR instance in the layer-2 header. This allows the destination hypervisor to identify the DVR instance based on the VLAN tag of the TVLAN in the layer-2 header. If a respective DVR instance corresponds to a different TVLAN, the switch may learn the MAC address of a respective hypervisor in association with each of these TVLANs. Since the number of DVR instances is typically limited, maintaining a separate TVLAN for a corresponding DVR instance provides a scalable solution for forwarding inter-VM traffic without imposing any restriction on the use of the header field of the layer-3 header. In this disclosure, the terms "DVR instance" and "DVR" are used interchangeably.

In this disclosure, the term "packet" refers to a group of bits that can be transported together across a network. "Packet" should not be interpreted as limiting embodiments of the present invention to any networking layer. "Packet" can be replaced by other terminologies referring to a group of bits, such as "message," "frame," "cell," or "datagram."

The term "switch" is used in a generic sense, and it can refer to any standalone or fabric switch operating in any network layer. "Switch" should not be interpreted as limiting embodiments of the present invention to layer-2 networks. Any physical or virtual device (e.g., a virtual machine, which can be a virtual switch, operating on a computing device) that can forward traffic to an end device can be referred to as a "switch." Examples of such a device include, but are not limited to, a layer-2 switch, a layer-3 router, or a TRILL RBridge.

Network Architecture

FIG. 1A illustrates an exemplary infrastructure that supports efficient inter-VM traffic forwarding based on a global TVLAN, in accordance with an embodiment of the present application. As illustrated in FIG. 1A, a network 100 includes switches 102 and 104. In some embodiments, one or more switches in network 100 can be virtual switches (e.g., a software switch running on a computing device). Switches 102 and 104 are coupled to host machines 120 and 130, respectively. Host machines 120 and 130 include hypervisors 122 and 132, respectively. VMs 124, 126, and 128 run on hypervisor 122, and virtual machines 134, 136, and 138 run on hypervisor 132.

In some embodiments, the hypervisors and VMs are configured, managed, and deployed from a management device 110. Management device 110 can be a controller of a software-defined network (SDN). Management device 110 can also be a virtualization manager. Examples of a virtualization manager include, but are not limited to, VMWare vCenter, Citrix XenCenter, and Microsoft Virtual Machine Manager. In this example, VMs 125, 134, and 135 are associated with VLAN 112, and VMs 124 and 136 are associated with VLAN 114 of tenant 1. On the other hand, VMs 122 and 133 are associated with VLAN 112 of tenant 2, and VMs 123, 126, and 132 are associated with VLAN 116 of tenant 2. For tenant isolation, routing and forwarding operations of tenants 1 and 2 can be based on two DVR instances (or DVRs) 142 and 144, respectively. By maintaining DVRs 142 and 144, hypervisors 121 and 131 can maintain separate routing instances for individual tenants based on corresponding routing policies.

With existing technologies, a DVR instance, such as DVR 142, allows hypervisor 121 to forward inter-VM traffic to hypervisor 131 via network 100. As a result, the same DVR 142 may operate on both hypervisors 121 and 131. Consequently, the MAC address of the routing interface of DVR 142 is also shared among hypervisors 121 and 131. To avoid the MAC address from being learned at local ports of both switches 102 and 104, the MAC address of the routing interface cannot be used for forwarding packets in network 100.

Since DVR 142 on hypervisor 121 operates as the gateway for VM 125, when VM 125 sends a packet 160 to VM 136, packet 160 includes the MAC address of DVR 142 as the destination address. Upon receiving packet 160, hypervisor 121 decapsulates the layer-2 header, looks up the IP address of VM 136 in DVR 142 (e.g., to determine the outgoing interface and the corresponding MAC address), and encapsulates packet 160 with a new layer-2 header. The source and destination addresses of the new layer-2 header can correspond to the MAC addresses of hypervisor 121 and VM 136, respectively. Hypervisor 121 can also include the tag of VLAN 114 of VM 136 in the new layer-2 header.

In this way, packet 160 is forwarded based on the MAC address of hypervisor 121 in network 100. Upon receiving the packet, switch 102 learns the MAC address of hypervisor 121 in association with the VLAN 114 of VM 136. Because the MAC address of hypervisor 121 (and hypervisor 131) can be used as the source address for a respective VLAN, switch 102 may learn the MAC address of hypervisors 121 and 131 for each of the VLANs to learn the corresponding <MAC, VLAN> pairs. Hence, the number of <MAC, VLAN> pairs learned by switch 102 can be significantly large and may not scale.

To solve this problem, a special TVLAN 152 can be dedicated for all inter-VM traffic in network 100. Switches 102 and 104 can then learn the MAC address of the hypervisors on a single TVLAN 152. For example, switch 102 can learn the MAC address of hypervisor 121 on TVLAN 152 regardless of the VLAN of the destination VM. This can significantly reduce the number of <MAC, VLAN> pairs learned by switches 102 and 104. To further reduce the number of <MAC, VLAN> pairs learned over TVLAN 152, the forwarding via TVLAN 152 can be based on MAC addresses of hypervisors 121 and 131. For example, hypervisor 121 can send packet 160 via TVLAN based on the MAC address of hypervisor 131 instead of using the MAC address of 136. As a result, the upper limit of the number of <MAC, VLAN> pairs learned by the switch from inter-VM traffic can be the number of hypervisors.

However, hypervisor 121 forwards packet 160 to hypervisor 131 instead of VM 136. Consequently, hypervisor 131 needs to determine which VM to forward packet 160 to once packet 160 reaches hypervisor 131. To do so, hypervisor 131 can terminate layer-2 forwarding, promote packet 160 to layer-3, and use DVR 142 to determine where to forward the packet. For example, hypervisor 131 can perform a lookup in DVR 142 based on the layer-3 header of packet 160, determine the forwarding interface and corresponding MAC address of VM 136, and forward packet 160 accordingly.

Furthermore, if TVLAN 152 is shared among DVRs 142 and 144 (i.e., TVLAN 152 operates as a global TVLAN for all DVRs), to forward packet 160 to VM 136, hypervisor 131 needs to identify the DVR instance corresponding to packet 160. Hypervisor 121 can include a DVR identifier of DVR 142 in a field of the layer-3 header of packet 160 to notify hypervisor 131 which DVR instance to select. In some embodiments, the field can be the identifier field of an IP header. Upon decapsulating the layer-2 header, hypervisor 131 can inspect the layer-3 header to identify the DVR identifier. However, since the field is used in an unconventional way, the intended use of that field thus becomes restricted. For example, since the identifier field of an IP header is used for fragmentation, using the identifier field to carry the DVR identifier imposes a restriction on fragmentation.

Figure 1B:
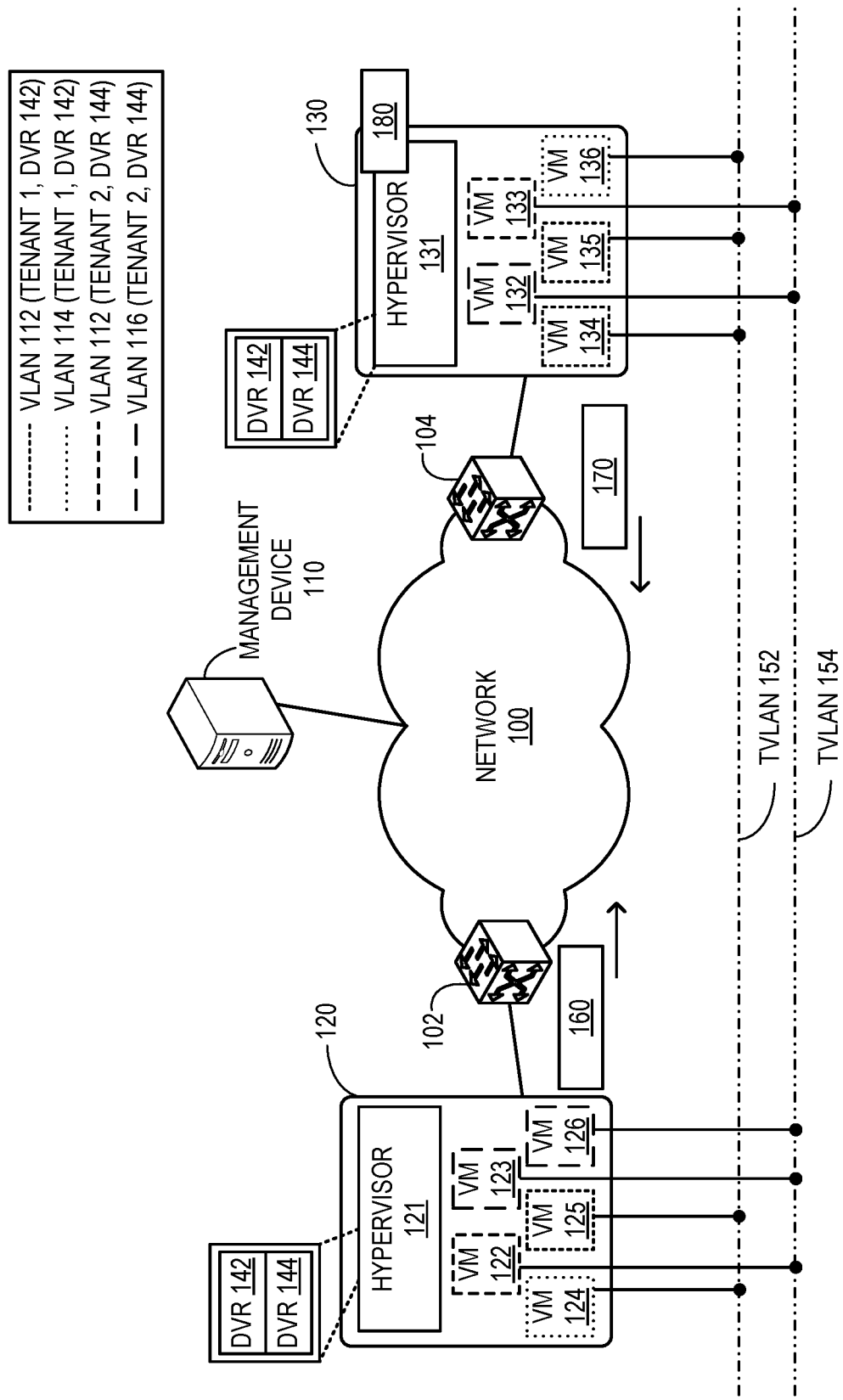
FIG. 1B illustrates an exemplary infrastructure that supports efficient inter-VM traffic forwarding based on a set of TVLANs corresponding to different DVR instances, in accordance with an embodiment of the present application.

To address this issue, a distinct and unique TVLAN can be allocated for a respective DVR instance. FIG. 1B illustrates an exemplary infrastructure that supports efficient inter-VM traffic forwarding based on a set of TVLANs corresponding to different DVR instances, in accordance with an embodiment of the present application. In this example, TVLANs 152 and 154 are allocated for DVRs 142 and 144, respectively. As a result, all traffic belonging to VMs of tenants 1 and 2 can be carried by TVLANs 152 and 154, respectively. Hypervisor 121 can include TVLAN 152 in the layer-2 header of packet 160. Hypervisor 131 can maintain a TVLAN mapping table 180. A respective entry of table 180 can map a TVLAN to a corresponding DVR.

Upon receiving packet 160, hypervisor 131 determines that packet 160 belongs to TVLAN 152 based on a VLAN identifier (e.g., the VLAN tag) of the layer-2 header of packet 160. Subsequently, hypervisor 131 can perform a lookup operation in table 180 based on TVLAN 152 and obtain DVR 142. Similarly, upon receiving a packet 170 forwarded based on DVR 144, hypervisor 121 can determine that packet 170 belongs to TVLAN 154 based on the VLAN tag of the layer-2 header of packet 170. Based on TVLAN 154, hypervisor 121 can then determine that the layer-3 header of packet 170 should be looked up in DVR 144.

In this way, TVLANs 152 and 154 allow hypervisors 121 and 131 to identify DVRs 142 and 144, respectively. However, since DVRs 142 and 144 correspond to different TVLANs, switches 102 and 104 may learn the MAC addresses hypervisors 121 and 131 in association with each of these TVLANs. Since the number of DVR instances is typically limited, maintaining a separate TVLAN for each of DVRs 142 and 144 provides a scalable solution for forwarding inter-VM traffic without imposing any restriction on the use of the header field of the layer-3 header.

Forwarding Based on a Transit VLANs

Figure 2A:
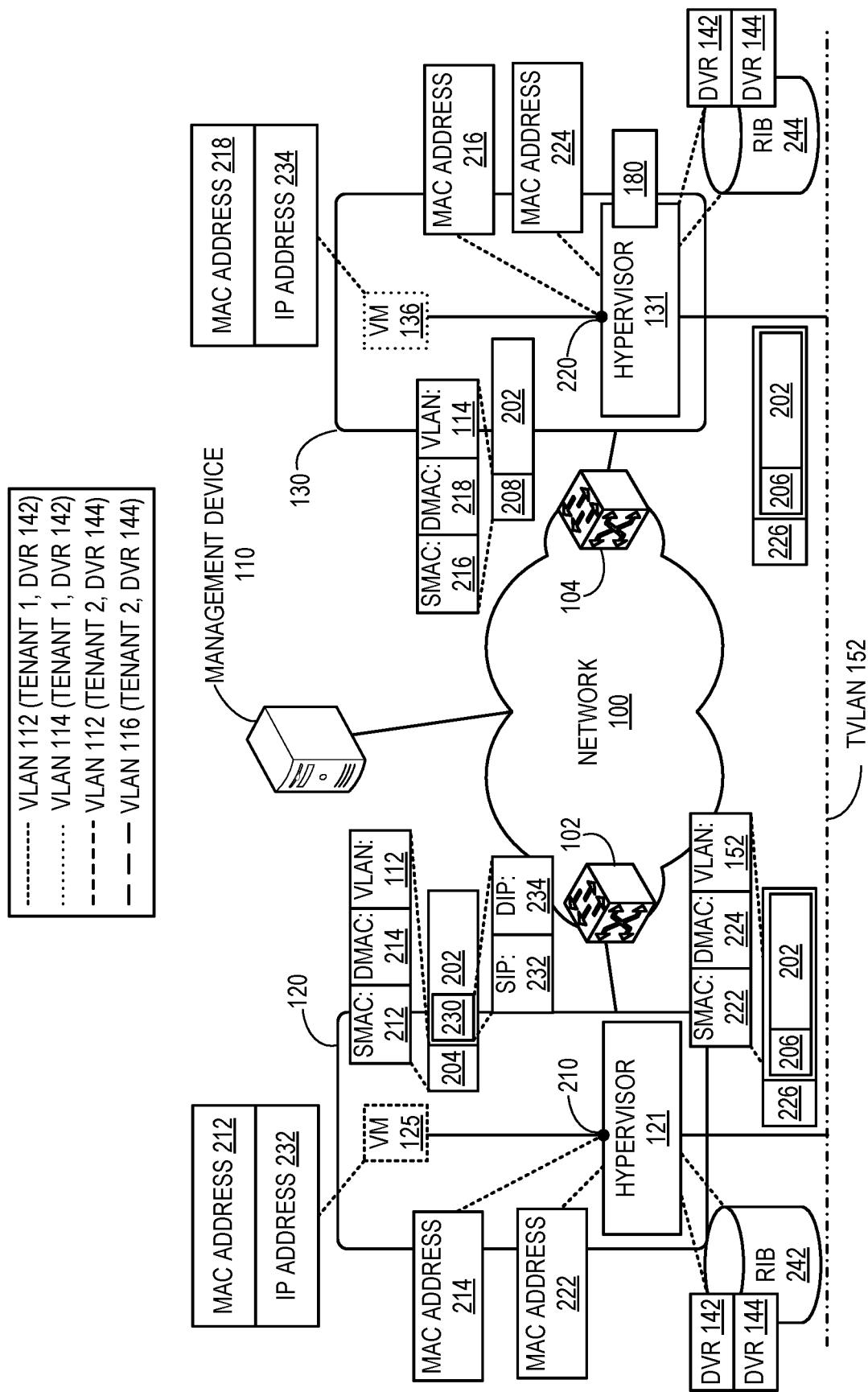
FIG. 2A illustrates exemplary efficient inter-VM traffic forwarding based on a TVLAN, in accordance with an embodiment of the present application.

FIG. 2A illustrates exemplary efficient inter-VM traffic forwarding based on a TVLAN, in accordance with an embodiment of the present application. Since the VMs running on hosts 120 and 130 belong to different VLANs, hypervisors 121 and 131 are configured to operate as a virtual layer-3 switch (e.g., a router). Accordingly, hypervisors 121 and 131 can store and maintain layer-3 routing information bases (RIBs) 242 and 244. Each of RIBs 242 and 244 can maintain DVRs 142 and 144. During operation, VM 125 can send a packet 202 with a layer-3 header (e.g., an IP header) 230 to VM 136. Header 230 can include IP address 232 of VM 125 and IP address 234 of VM 136 as the source and destination IP addresses, respectively.

VM 125 then encapsulate packet 202 with a layer-2 header 204 (e.g., an Ethernet header). Header 204 can include MAC address 212 of VM 125 as the source MAC address. Since DVR 142 on hypervisor 121 operates as the gateway for VM 125, header 204 includes MAC address 214 of routing interface 210 of DVR 142 on hypervisor 121 as the destination MAC address. VM 125 can also include a VLAN tag corresponding to its VLAN 112 in header 204. In some embodiments, MAC address 214 is associated with VLAN 112. If hypervisor 121 receives a packet with a different VLAN, such as VLAN 114, via interface 210, the destination MAC address of the packet can be a different MAC address 216 associated with VLAN 114. In this way, interface 210 can participate in different VLANs of tenant 1.

VM 125 can then forward packet 202 to hypervisor 121. Upon receiving packet 202, hypervisor 121 determines that MAC address 214 is a local address. Hence, hypervisor 121 decapsulates header 204 and promotes packet 202 to layer-3. Since VM 125 belongs to tenant 1, hypervisor 121 looks up destination IP address 234 in DVR 142 of RIB 242 to determine the outgoing interface. Hypervisor 121 determines that the next-hop MAC address is MAC address 224 of hypervisor 131.

Accordingly, hypervisor 121 encapsulates packet 202 with a new layer-2 header 206. The source and destination MAC addresses of header 206 correspond to MAC address 222 of hypervisor 121 and MAC address 224, respectively. Hypervisor 121 can also include a VLAN tag corresponding to TVLAN 152 in header 206. Hypervisor 121 then sends packet 202 to hypervisor 131. In some embodiments, to forward packet 202 via network 100, hypervisor 121 can encapsulate packet 202 in an encapsulation header 226 with a destination IP address allocated to hypervisor 131. Encapsulation header 226 can be based on an overlay encapsulation protocol. Examples of an overlay encapsulation protocol include, but are not limited to, virtual extensible LAN (VXLAN), generic routing encapsulation (GRE), network virtualization using GRE (NVGRE), layer-2 tunneling protocol (L2TP), multi-protocol label switching (MPLS), and secure socket tunneling protocol (SSTP).

Hypervisor 131 can receive encapsulated packet 202, determines that the destination IP address of header 226 is a local IP address, and decapsulates header 226. Since packet 202 is forwarded to hypervisor 131 instead of VM 136, hypervisor 131 needs to determine which VM to forward packet 202. If IP fragmentation is enabled, hypervisor 131 can obtain the VLAN tag corresponding to TVLAN 152 in header 206 and lookup the tag in table 180 to obtain the identifier of DVR 142. Subsequently, hypervisor 131 determines that the MAC address of header 206 is a local MAC address, decapsulates header 206, and promotes packet 202 to layer-3. If IP fragmentation is disabled, by decapsulating header 206, hypervisor 131 can inspect the identifier field of header 230 to determine the identifier of DVR 142.

Upon identifying DVR 142, hypervisor 131 can lookup destination IP address 234 in DVR 142 of RIB 244 to determine the outgoing interface. Hypervisor 131 determines that the next-hop MAC address is MAC address 218 of VM 136. Furthermore, since packet 202 is looked up from DVR 142, hypervisor 131 uses routing interface 220 of DVR 142 on hypervisor 131 to forward packet 202. Accordingly, hypervisor 131 encapsulates packet 202 with a new layer-2 header 208. The source and destination MAC addresses of header 208 correspond to MAC address 216 of interface 220 and MAC address 218, respectively. Hypervisor 121 can also include a VLAN tag corresponding to VLAN 114 in header 206. MAC address 216 can be associated with VLAN 114. Hypervisor 121 then sends packet 202 to VM 136. In this way, hypervisor 121 can use TVLAN 152 to forward a packet to hypervisor 131.

Figures 2B, 2C:
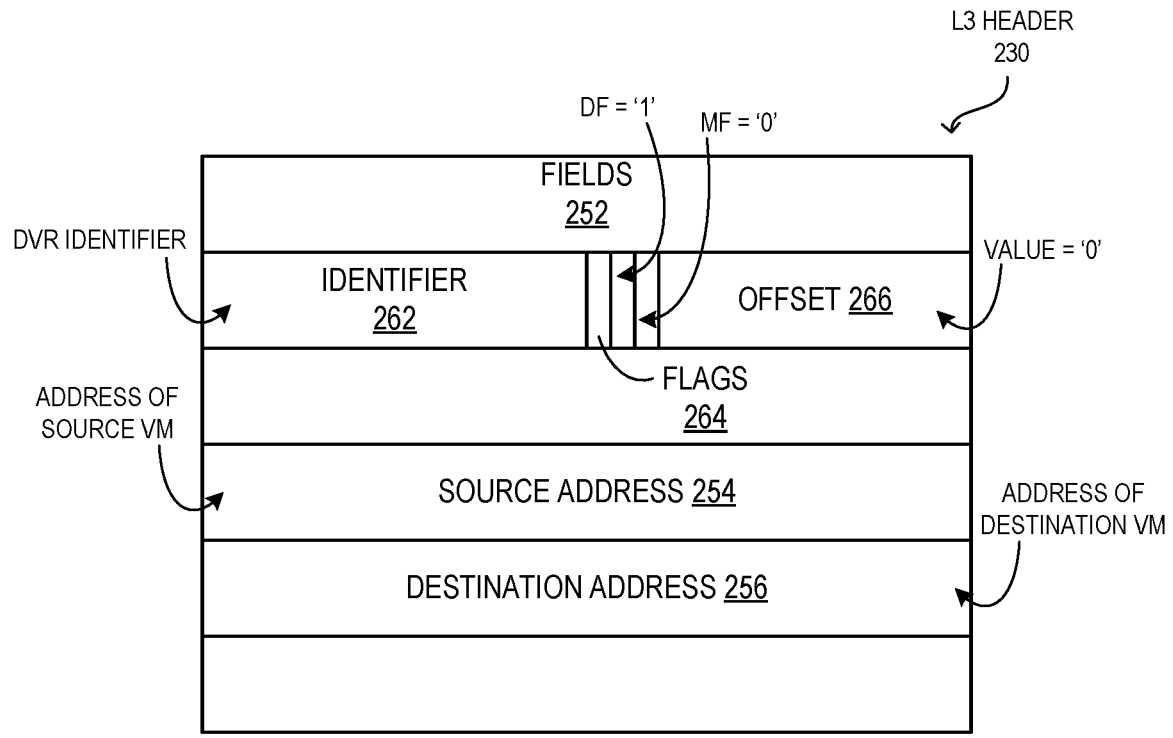
FIG. 2B illustrates an exemplary layer-3 header with a DVR identifier for facilitating efficient inter-VM traffic forwarding, in accordance with an embodiment of the present application.
FIG. 2C illustrates an exemplary TVLAN mapping table for facilitating efficient inter-VM traffic forwarding, in accordance with an embodiment of the present application.

FIG. 2B illustrates an exemplary layer-3 header with a DVR identifier for facilitating efficient inter-VM traffic forwarding, in accordance with an embodiment of the present application. Layer-3 header 250 can include a number of fields 252, a source address 254, and a destination address 256. For inter-VM traffic, source address 254 and destination address 256 can correspond to the IP addresses of the source and destination VMs, respectively. Fields 252 can include an identifier 262, a set of flags 264, and an offset 266. Flags 264 can include a DF ("Don't Fragment") flag and an MF ("More Fragments") flag. In some embodiments, the layer-3 header is an IP header, and identifier 262 is an IPv4 identifier.

In some embodiments, identifier 262 can be used to indicate a DVR identifier that identifies the DVR used for processing header 250. However, using identifier 262 to indicate a DVR instance imposes a limit on the DVR. The DVR prevents the interpretation of identifier 262 for processing header 250. Consequently, the DVR would restrict the usage of large packets that would require fragmentation and reassembly. This restriction can be feasible in scenarios where fragmentation is discouraged (or not allowed). To ensure that the underlying network does not interpret identifier 262 while processing header 250, a hypervisor can mark the packet of header 250 as atomic. To do so, the hypervisor can set DF to '1,' MF to '0,' and offset 266 to '0.' An atomic packet is one that has not yet been fragmented (MF=0 and offset 266 with a value of '0') and for which further fragmentation is inhibited (DF=1). Indicating a packet to be an atomic packet allows header 250 to carry a DVR identifier in identifier 262.

FIG. 2C illustrates an exemplary TVLAN mapping table for facilitating efficient inter-VM traffic forwarding, in accordance with an embodiment of the present application. TVLAN mapping table 180 can include an entry comprising a mapping between TVLAN 152 and a corresponding DVR 142. In table 180, TVLAN 152 can be represented by a corresponding VLAN tag and DVR 142 can be represented by a corresponding DVR identifier. TVLAN mapping table 180 can also include an entry comprising a mapping between TVLAN 154 and a corresponding DVR 144. The mappings in table 180 allow a hypervisor to select a DVR based on the TVLAN in the header of a packet.

Operations

Figure 3:
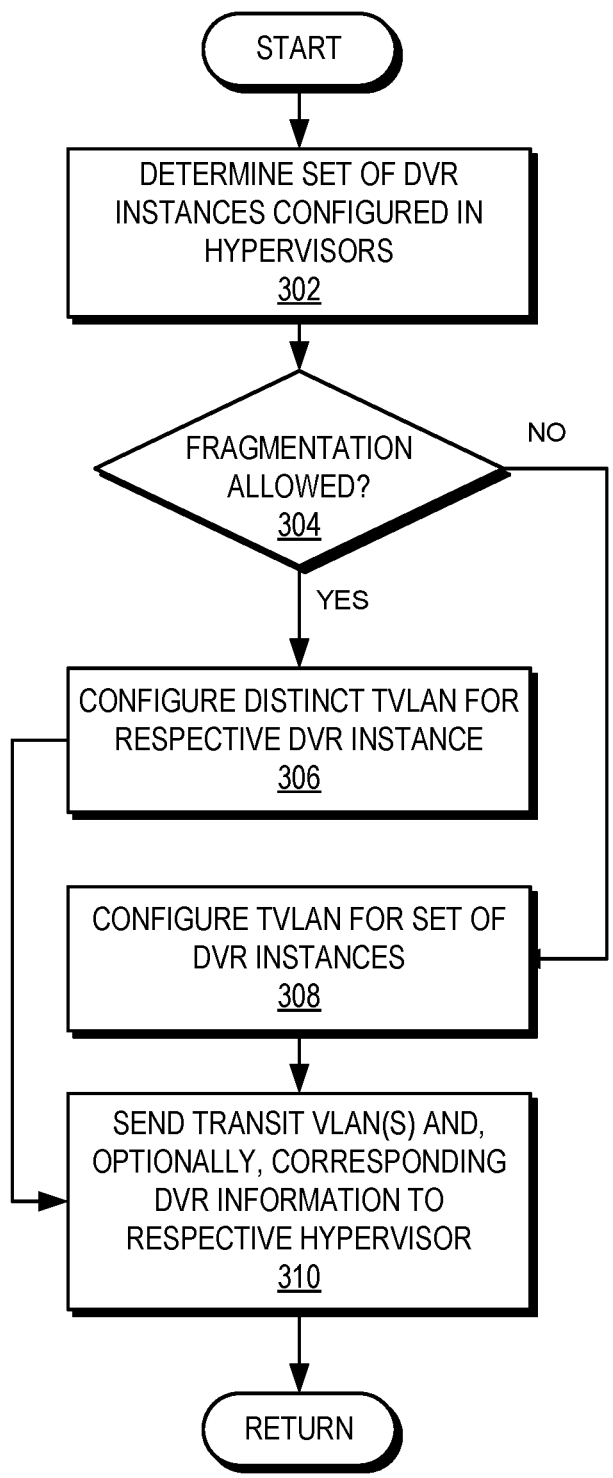
FIG. 3 presents a flowchart illustrating a method of a management device configuring TVLAN(s) for hypervisors, in accordance with an embodiment of the present application.

FIG. 3 presents a flowchart illustrating a method of a management device configuring TVLAN(s) for hypervisors, in accordance with an embodiment of the present application. The management device can be a controller of an SDN or a virtualization manager. During operation, the device determines a set of DVR instances (or DVRs) configured in the hypervisors (operations 302) and checks whether the fragmentation is allowed (operation 304). If the fragmentation is allowed, the identifier field of a layer-3 header is not available for carrying a DVR identifier. The device then configures a distinct TVLAN for a respective DVR instance of the set of DVR instances (operation 306).

On the other hand, if the fragmentation is not allowed, the identifier field of a layer-3 header can carry a DVR identifier. The device configures then a TVLAN for the set of DVR instances (operation 308). Since a single TVLAN can be configured in a network, the TVLAN can also be referred to as a global TVLAN. Upon configuring the TVLAN(s) for the DVR instances (operation 306 or 308), the device sends the TVLAN(s) and, optionally, the corresponding DVR information to a respective hypervisor (operation 310).

Figure 4A:
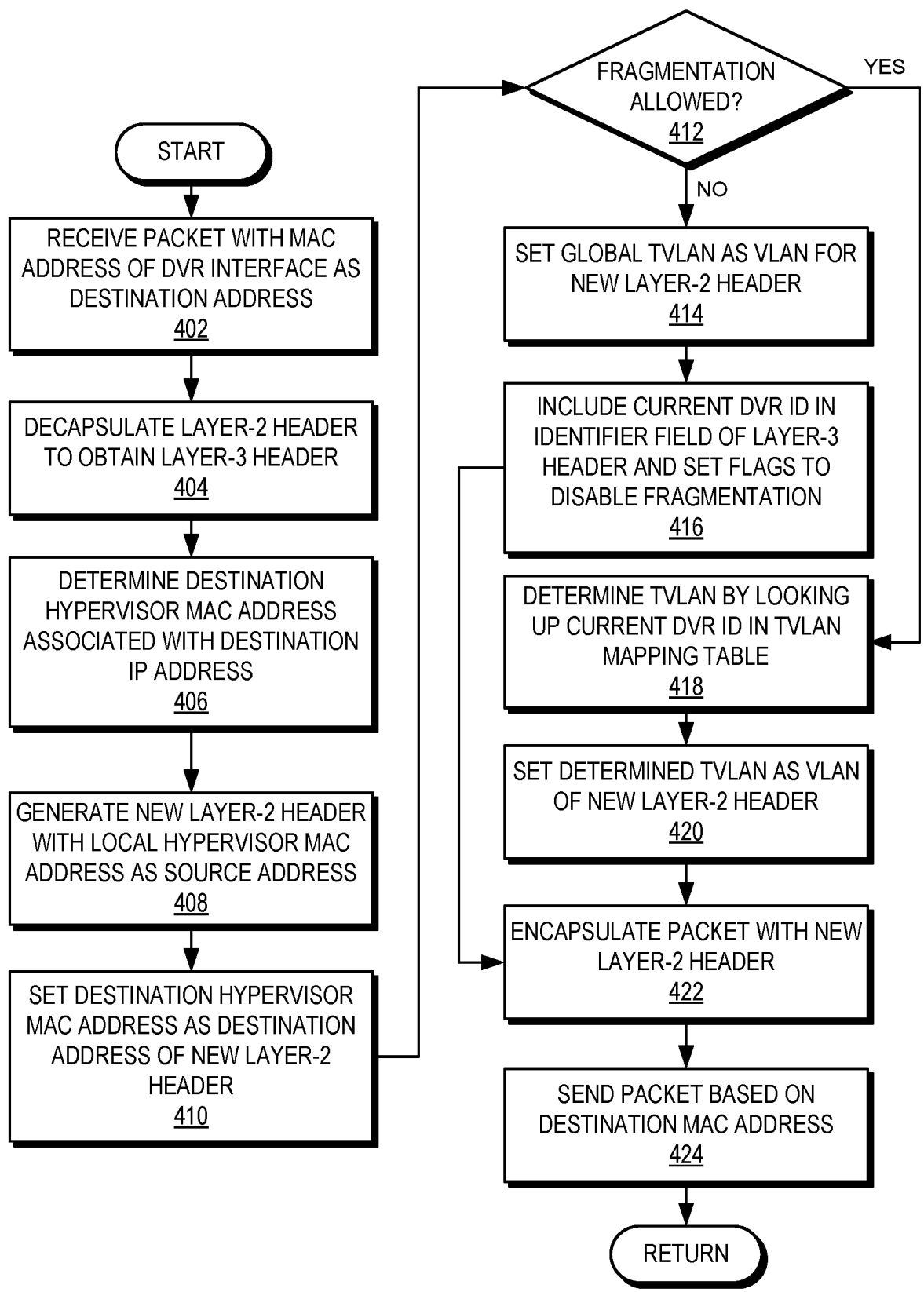
FIG. 4A presents a flowchart illustrating a method of a hypervisor forwarding an inter-VM packet to a remote hypervisor, in accordance with an embodiment of the present application.

FIG. 4A presents a flowchart illustrating a method of a hypervisor forwarding an inter-VM packet to a remote hypervisor, in accordance with an embodiment of the present application. During operation, the hypervisor receives a packet with the MAC address of the DVR interface as the destination address (operation 402). The hypervisor then decapsulates the layer-2 header to obtain the layer-3 header (operation 404) and determines the destination hypervisor MAC address associated with the destination IP address (operation 406). The hypervisor then generates a new layer-2 header with the local hypervisor MAC address as the source address (operation 408). The hypervisor also sets the destination hypervisor MAC address as the destination address of the new layer-2 header (operation 410).

The hypervisor then checks whether fragmentation is allowed in the network (operation 412). If fragmentation is not allowed, the hypervisor sets the global TVLAN as the VLAN for the new layer-2 header (i.e., includes the VLAN tag of the TVLAN in the layer-2 header) (operation 414). The hypervisor also includes the current DVR identifier in the identifier field of the layer-3 header and sets the flags of the layer-3 header to disable fragmentation (operation 416). On the other hand, if fragmentation is allowed, the hypervisor determines a TVLAN by looking up the current DVR identifier in the TVLAN mapping table (operation 418) and sets the determined TVLAN as the VLAN of the new layer-2 header (operation 420).

Upon including the current DVR identifier in the layer-3 header (operation 416) or setting the determined TVLAN as the VLAN for the new layer-2 header (operation 420), the hypervisor encapsulates the packet with the new layer-2 header (operation 422). The hypervisor then sends the packet based on the destination MAC address of the new layer-2 header (operation 424). Here, the layer-2 header can be an Ethernet header, and the layer-3 header can be an IP header. The identifier field can be an IP identifier field (e.g., an IPv4 identifier field).

Figure 4B:
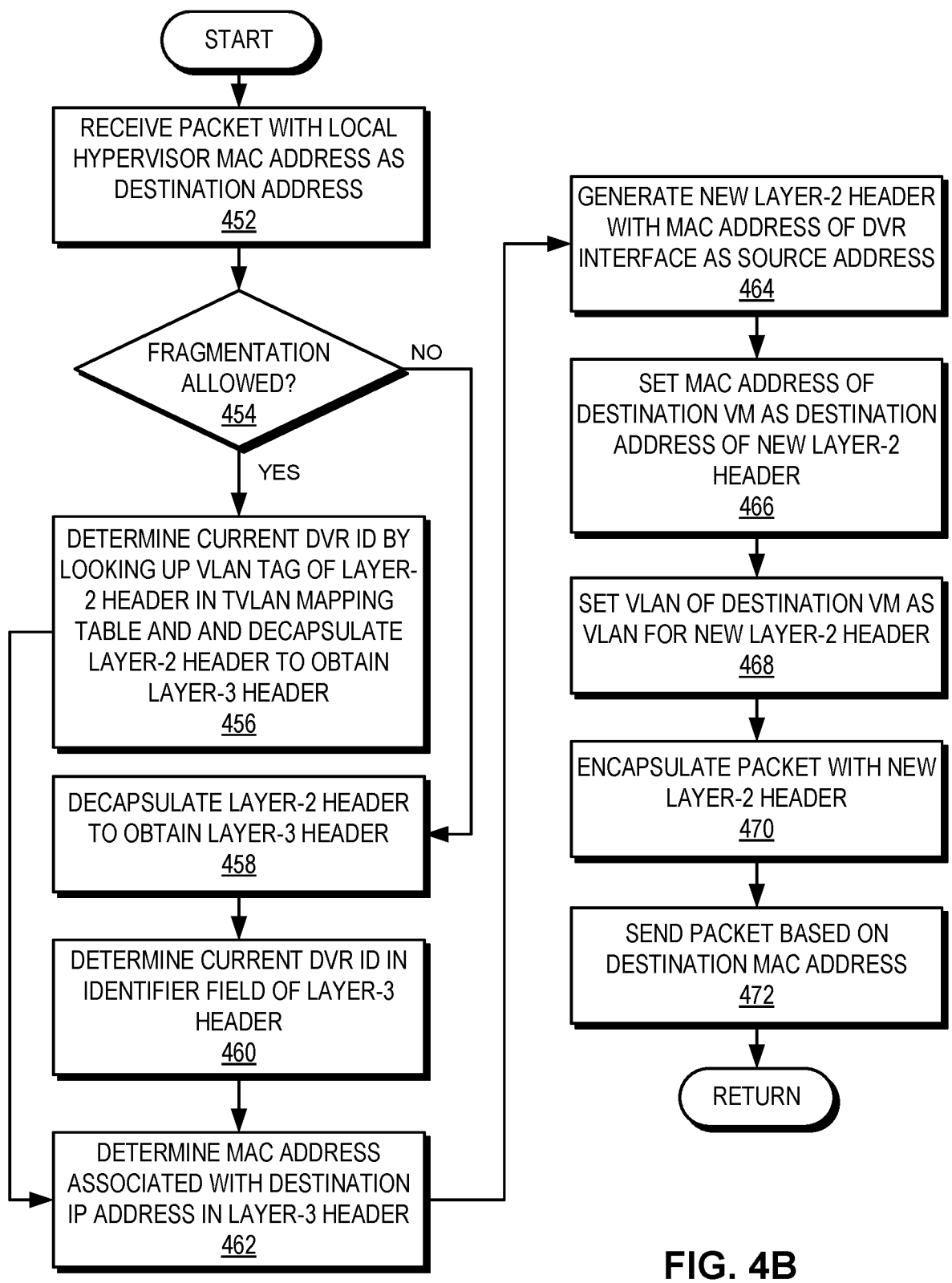
FIG. 4B presents a flowchart illustrating a method of a hypervisor receiving an inter-VM packet from a remote hypervisor and forwarding the packet to a destination VM, in accordance with an embodiment of the present application.

FIG. 4B presents a flowchart illustrating a method of a hypervisor receiving an inter-VM packet from a remote hypervisor and forwarding the packet to a destination VM, in accordance with an embodiment of the present application. During operation, the hypervisor receives a packet with the local MAC address as the destination address (operation 452). The hypervisor then checks whether fragmentation is allowed in the network (operation 454). If fragmentation is allowed, the hypervisor determines the current DVR identifier by looking up the VLAN tag of the layer-2 header in the TVLAN mapping table and decapsulate the layer-2 header to obtain the layer-3 header (operation 456).

On the other hand, if fragmentation is not allowed, the hypervisor decapsulates the layer-2 header to obtain the layer-3 header (operation 458) and determines the current DVR identifier in the identifier field of the layer-3 header (operation 460). Upon determining the current DVR identifier (operation 456 or 460), the hypervisor determines the MAC address associated with the destination IP address in the layer-3 header (operation 462). The MAC address can correspond to the destination VM. The hypervisor then generates a new layer-2 header with the MAC address of the DVR interface associated with the DVR identifier as the source address (operation 464).

The hypervisor also sets the MAC address of the destination VM as the destination address of the new layer-2 header (operation 466). The hypervisor sets the VLAN of the destination VM as the VLAN for the new layer-2 header (operation 468). Subsequently, the hypervisor encapsulates the packet with the new layer-2 header (operation 470). The hypervisor then sends the packet based on the destination MAC address of the new layer-2 header (operation 424). In this way, the destination hypervisor can receive a packet via a TVLAN and forward the packet to the destination VM.

Exemplary Computer System and Apparatus

Figure 5:
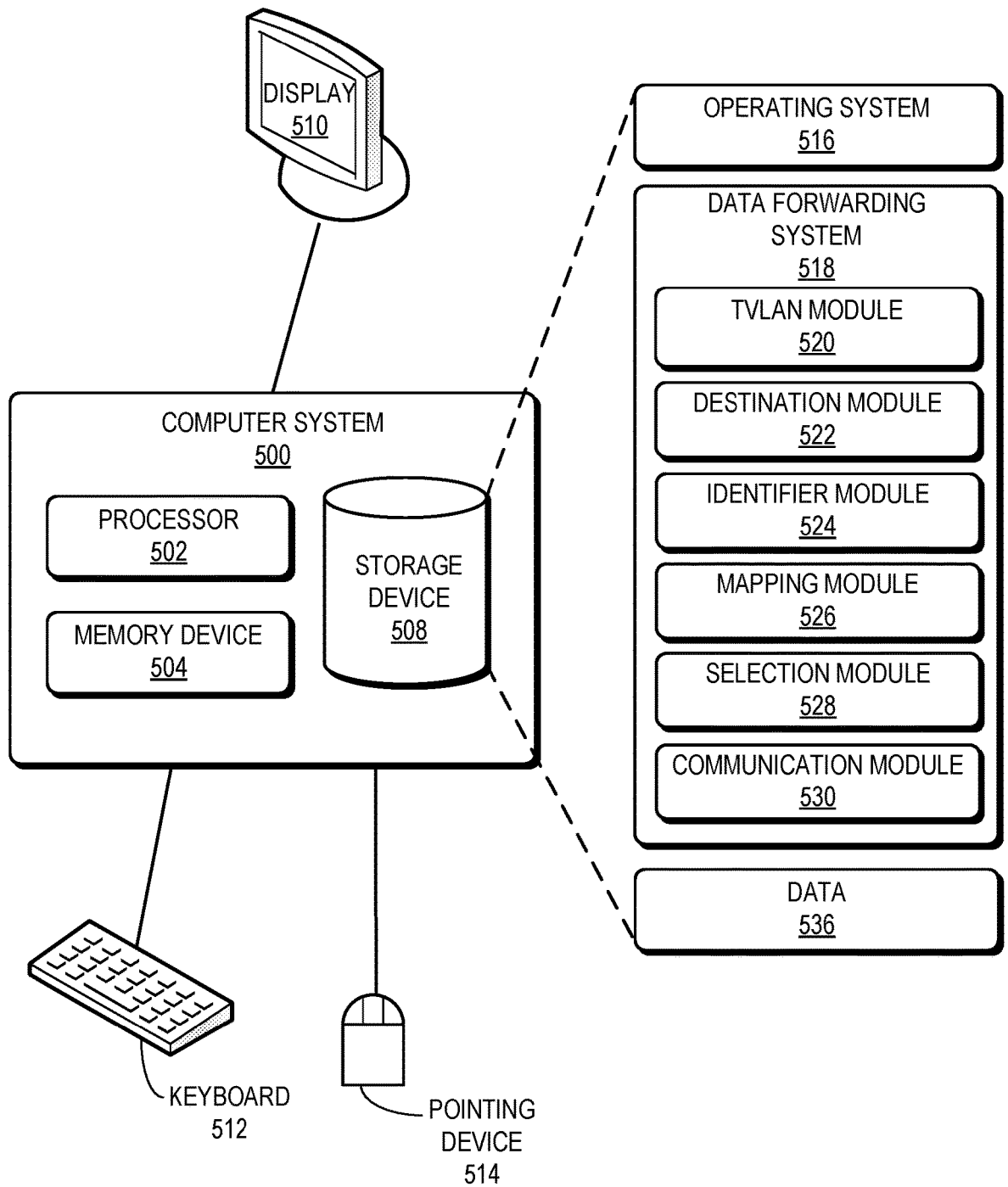
FIG. 5 illustrates an exemplary computer system that facilitates efficient inter-VM traffic forwarding, in accordance with an embodiment of the present application.

FIG. 5 illustrates an exemplary computer system that facilitates efficient inter-VM traffic forwarding, in accordance with an embodiment of the present application. Computer system 500 includes a processor 502, a memory 504, and a storage device 508. Memory 504 can include a volatile memory (e.g., a dual in-line memory module (DIMM)). Furthermore, computer system 500 can be coupled to a display device 510, a keyboard 512, and a pointing device 514. Storage device 508 can store an operating system 516, a data forwarding system 518, and data 536.

Data forwarding system 518 can include instructions, which when executed by computer system 500, can cause computer system 500 to perform methods and/or processes described in this disclosure. Specifically, Data forwarding system 518 can include instructions for configuring one or more TVLANs in a hypervisor for facilitating inter-VM traffic (TVLAN module 520). Data forwarding system 518 can also include instructions for selecting a destination hypervisor as a destination for a packet forwarded via the TVLAN (destination module 522). Furthermore, data forwarding system 518 can include instructions for including a DVR identifier in the layer-3 header of the packet (identifier module 524).

Moreover, data forwarding system 518 includes instructions for maintaining a mapping between a VLAN tag of a TVLAN and a DVR identifier (e.g., in a TVLAN mapping table) (mapping module 526). Data forwarding system 518 can also include instructions for looking up a DVR identifier or a VLAN tag of a TVLAN in the mapping (selection module 528). Data forwarding system 518 can further include instructions for selecting a TVLAN based on the lookup and including a VLAN tag of a TVLAN in a layer-2 header (selection module 528). Data forwarding system 518 can also include instructions for sending and receiving layer-2 and/or layer-3 packets (communication module 530).

Data 536 can include any data that is required as input or that is generated as output by the methods and/or processes described in this disclosure. Specifically, data 536 can store at least: a TVLAN mapping table and configuration information associated with a TVLAN.

Figure 6:
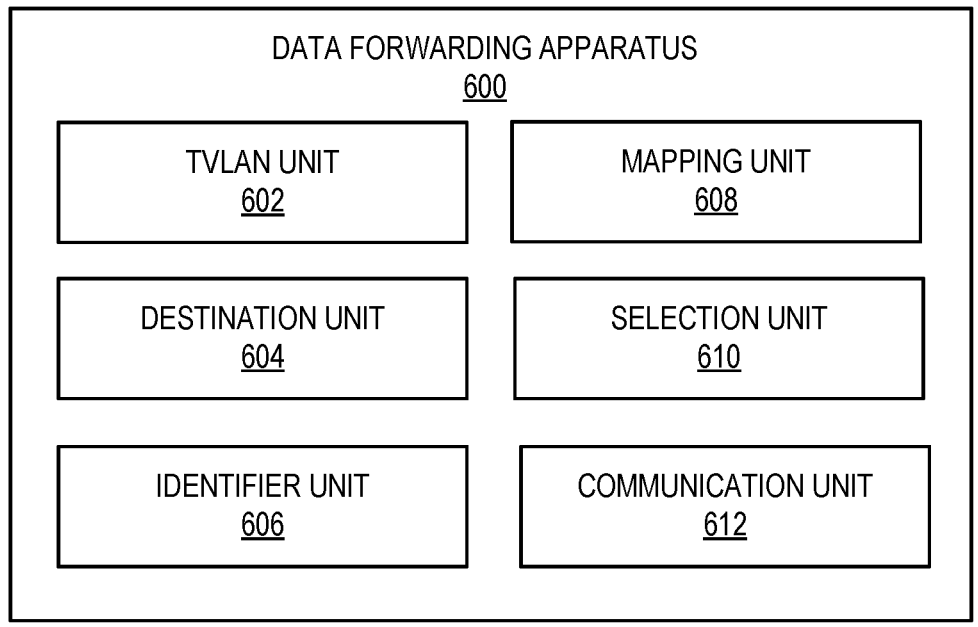
FIG. 6 illustrates an exemplary apparatus that facilitates efficient inter-VM traffic forwarding, in accordance with an embodiment of the present application.

FIG. 6 illustrates an exemplary apparatus that facilitates efficient inter-VM traffic forwarding, in accordance with an embodiment of the present application. Apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated in a computer system, or realized as a separate device which is capable of communicating with other computer systems and/or devices. Apparatus 600 may also be a virtual device (e.g., a VM, a hypervisor, etc.).

Specifically, apparatus 600 can comprise units 602-612, which perform functions or operations similar to modules 520-530 of computer system 500 of FIG. 5, including: a TVLAN unit 502; a destination unit 504; an identifier unit 606; a mapping unit 608; a selection unit 610; and a communication unit 612.

Note that the above-mentioned modules can be implemented in hardware as well as in software. In one embodiment, these modules can be embodied in computer-executable instructions stored in a memory which is coupled to one or more processors in computer system 500 and/or apparatus 600. When executed, these instructions cause the processor(s) to perform the aforementioned functions.

In summary, embodiments of the present invention provide a system and a method that enable efficient traffic forwarding in a hypervisor. In one embodiment, the hypervisor determines that a packet is from a first VM running on the hypervisor and destined to a second VM running on a remote hypervisor. The hypervisor then includes a VLAN identifier of a TVLAN in a layer-2 header of the packet. The TVLAN is dedicated for inter-VM traffic associated with a DVR instance operating on the hypervisor and the remote hypervisor. Subsequently, the hypervisor sets a first MAC address of the hypervisor as a source MAC address and a second MAC address of the remote hypervisor as a destination MAC address in the layer-2 header. The hypervisor then determines an egress port for the packet based on the second MAC address.

The methods and processes described herein can be embodied as code and/or data, which can be stored in a non-transitory computer-readable storage medium. When a computer system reads and executes the code and/or data stored on the non-transitory computer-readable storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
obtaining, by a hypervisor, a layer-2 packet from a first virtual machine (VM) running on the hypervisor;
determining, by the hypervisor, that a destination media access control (MAC) address in a first layer-2 header of the layer-2 packet is allocated to a second VM running on a remote hypervisor;
decapsulating, by the hypervisor, the first layer-2 header to obtain an inner layer-3 packet;
obtaining, by the hypervisor, a virtual local area network (VLAN) identifier of a transit VLAN (TVLAN) from a mapping between the VLAN identifier and a distributed virtual routing (DVR) identifier of a DVR instance operating on the hypervisor and the remote hypervisor, wherein the TVLAN is dedicated for inter-VM traffic of a plurality of VLANs associated with the DVR instance, and wherein a respective DVR instance facilitates a routing for a corresponding tenant;
encapsulating, by the hypervisor, the inner layer-3 packet with a second layer-2 header comprising the VLAN identifier of the TVLAN to generate an updated layer-2 packet;
setting a first MAC address of the hypervisor as a source MAC address and a second MAC address of the remote hypervisor as a destination MAC address in the second layer-2 header; and
determining an egress port corresponding to the remote hypervisor for the updated layer-2 packet based on the second MAC address in the second layer-2 header.

2. The method of claim 1, further comprising including an identifier of the DVR instance in a layer-3 header of the inner layer-3 packet prior to encapsulating the inner layer-3 packet with the second layer-2 header.

3. The method of claim 1, wherein the TVLAN is further dedicated for all inter-VM traffic associated with a second DVR instance operating on the hypervisor and the remote hypervisor.

4. The method of claim 1, wherein the data structure further comprises a second mapping between a second DVR identifier of a second DVR instance and a VLAN identifier of a second TVLAN, wherein the second TVLAN is dedicated for all inter-VM traffic associated with the second DVR instance operating on the hypervisor and the remote hypervisor.

5. The method of claim 1, further comprising:
   receiving, by the hypervisor, a second packet destined to the VM;
   identifying, based on a value of a field of the second packet, that the second packet corresponds to the DVR instance; and
   determining a forwarding interface for the second packet based on the DVR instance.

6. The method of claim 5, wherein the value of the field of the second packet indicates one of:
   the VLAN identifier of the TVLAN in a layer-2 header of the second packet; and
   a DVR identifier of the DVR instance in a layer-3 header of the second packet.

7. The method of claim 1, wherein the first VM and the second VM belong to a first VLAN and a second VLAN, respectively, and wherein the first and second VLANs are distinct from the TVLAN.

8. The method of claim 1, further comprising receiving an instruction for configuring the TVLAN for forwarding all inter-VM traffic associated with the DVR instance from a management device, wherein the management device is one of:
   a controller of a software-defined network (SDN); and
   a virtualization manager configured to manage the hypervisor.

9. The method of claim 1, further comprising receiving, by the hypervisor, the packet via a local interface associated with the DVR instance on the hypervisor.

10. The method of claim 1, further comprising encapsulating, by the hypervisor, the updated layer-2 packet with a tunnel encapsulation header, wherein a destination address of the tunnel encapsulation header corresponds to the remote hypervisor.

11. A computer system, comprising:
    a processor; and
    a memory coupled to the processor and storing instructions, which when executed by the processor cause the processor to perform a method, the method comprising:
    obtaining, by a hypervisor, a layer-2 packet from a first virtual machine (VM) running on the hypervisor;
    determining, by the hypervisor, that a destination media access control (MAC) address in a first layer-2 header of the layer-2 packet is allocated to a second VM running on a remote hypervisor;
    decapsulating, by the hypervisor, the first layer-2 header to obtain an inner layer-3 packet;
    obtaining, by the hypervisor, a virtual local area network (VLAN) identifier of a transit VLAN (TVLAN) from a mapping between the VLAN identifier and a distributed virtual routing (DVR) identifier of a DVR instance operating on the hypervisor and the remote hypervisor, wherein the TVLAN is dedicated for inter-VM traffic of a plurality of VLANs associated with the DVR instance, and wherein a respective DVR instance facilitates a routing for a corresponding tenant;
    encapsulating, by the hypervisor, the inner layer-3 packet with a second layer-2 header comprising the VLAN identifier of the TVLAN to generate an updated layer-2 packet;
    setting a first MAC address of the hypervisor as a source MAC address and a second MAC address of the remote hypervisor as a destination MAC address in the second layer-2 header; and
    determining an egress port corresponding to the remote hypervisor for the updated layer-2 packet based on the second MAC address in the second layer-2 header.

12. The computer system of claim 11, wherein the method further comprises including an identifier of the DVR instance in a layer-3 header of the inner layer-3 packet prior to encapsulating the inner layer-3 packet with the second layer-2 header.

13. The computer system of claim 11, wherein the TVLAN is further dedicated for all inter-VM traffic associated with a second DVR instance operating on the hypervisor and the remote hypervisor.

14. The computer system of claim 11, wherein the data structure further comprises a second mapping between a second DVR identifier of a second DVR instance and a VLAN identifier of a second TVLAN, wherein the second TVLAN is dedicated for all inter-VM traffic associated with the second DVR instance operating on the hypervisor and the remote hypervisor.

15. The computer system of claim 11, wherein the method further comprises:
    receiving, by the hypervisor, a second packet destined to the VM;
    identifying, based on a value of a field of the second packet, that the second packet corresponds to the DVR instance; and
    determining a forwarding interface for the second packet based on the DVR instance.

16. The computer system of claim 15, wherein the value of the field of the second packet indicates one of:
    the VLAN identifier of the TVLAN in a layer-2 header of the second packet; and
    a DVR identifier of the DVR instance in a layer-3 header of the second packet.

17. The computer system of claim 11, wherein the first VM and the second VM belong to a first VLAN and a second VLAN, respectively, and wherein the first and second VLANs are distinct from the TVLAN.

18. The computer system of claim 11, wherein the method further comprises receiving an instruction for configuring the TVLAN for forwarding all inter-VM traffic associated with the DVR instance from a management device, wherein the management device is one of:
    a controller of a software-defined network (SDN); and
    a virtualization manager configured to manage the hypervisor.

19. The computer system of claim 11, wherein the method further comprises receiving, by the hypervisor, the packet via a local interface associated with the DVR instance on the hypervisor.

20. The computer system of claim 11, wherein the method further comprises encapsulating the updated layer-2 packet with a tunnel encapsulation header, wherein a destination address of the tunnel encapsulation header corresponds to the remote hypervisor.

* * * * *